US012122352B2

(12) United States Patent
Wrobel et al.

(10) Patent No.: US 12,122,352 B2
(45) Date of Patent: Oct. 22, 2024

(54) SYSTEMS AND METHODS FOR MORE ACCURATELY ADJUSTING TRAFFIC PREDICTIONS FOR THE INTENDED USE OF OPTIMIZING BATTERY PRE-CHARGING

(71) Applicant: Toyota Motor Engineering & Manufacturing North America, Inc., Plano, TX (US)

(72) Inventors: Shannon Alicia Wrobel, Erlanger, KY (US); Joshua D. Payne, Erlanger, KY (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 319 days.

(21) Appl. No.: 15/615,803

(22) Filed: Jun. 6, 2017

(65) Prior Publication Data

US 2018/0345801 A1 Dec. 6, 2018

(51) Int. Cl.
*G01C 21/34* (2006.01)
*B60W 20/12* (2016.01)
(Continued)

(52) U.S. Cl.
CPC ......... *B60W 20/12* (2016.01); *G01C 21/3492* (2013.01); *G06Q 10/047* (2013.01);
(Continued)

(58) Field of Classification Search
CPC .............. B60L 11/1809; B60L 2240/68; B60L 2240/70; B60L 2240/80; G01C 21/3492;
(Continued)

(56) References Cited

U.S. PATENT DOCUMENTS 5,668,717 A * 9/1997 Spall ...................... G08G 1/081
700/51
5,778,326 A * 7/1998 Moroto ................. B60W 10/08
903/903
(Continued)

FOREIGN PATENT DOCUMENTS

JP 2005128808 A 5/2005
JP 2006078405 A 3/2006
(Continued)

OTHER PUBLICATIONS

English translation of Decision to Grant mailed Oct. 4, 2022, in related Japanese Patent Application No. 2018-092168, Japanese Patent No. 7166788.
(Continued)

*Primary Examiner* — John T Trischler
(74) *Attorney, Agent, or Firm* — SHEPPARD, MULLIN, RICHTER & HAMPTON LLP; Daniel N. Yannuzzi

(57) ABSTRACT

Systems and methods are provided for optimizing predictions regarding traffic conditions based upon learned/measured traffic conditions. Current traffic conditions can be measured and characterized based on speed or other factors as a vehicle traverses the route. These measured traffic conditions can be compared to predicted traffic conditions. A weighting term can be associated with the measured traffic conditions based upon the comparison. During a subsequent time that the vehicle traverses the route, a traffic conditions prediction may be made. The weighting term and measured traffic conditions data can be used to adjust the traffic conditions prediction for better accuracy, and an optimal time(s) during which a battery of a hybrid vehicle can be pre-charged can be requested.

20 Claims, 7 Drawing Sheets

(51) Int. Cl.
*G06Q 10/047* (2023.01)
*G08G 1/01* (2006.01)

(52) U.S. Cl.
CPC ......... *G08G 1/0112* (2013.01); *G08G 1/0129* (2013.01); *B60L 2240/68* (2013.01); *B60L 2240/70* (2013.01); *B60L 2240/80* (2013.01); *G08G 1/0141* (2013.01); *Y02T 90/14* (2013.01)

(58) Field of Classification Search
CPC .. G06Q 10/047; G08G 1/0112; G08G 1/0129; G08G 1/0141; Y02T 90/14; B60W 20/12
USPC .......................................... 320/104; 701/117
See application file for complete search history.

(56) References Cited

U.S. PATENT DOCUMENTS

| | | | | |
|---|---|---|---|---|
| 5,815,824 A * | 9/1998 | Saga | B60W 20/00 180/65.245 |
| 5,832,396 A | 11/1998 | Moroto | |
| 6,317,686 B1 * | 11/2001 | Ran | G01C 21/3691 701/117 |
| 6,401,027 B1 * | 6/2002 | Xu | G08G 1/0104 340/988 |
| 7,472,099 B2 * | 12/2008 | Nishiuma | G06Q 10/04 706/14 |
| 7,536,254 B2 * | 5/2009 | Kumagai | G08G 1/0104 340/995.13 |
| 7,542,844 B2 * | 6/2009 | Kumagai | G08G 1/0129 340/995.13 |
| 7,610,145 B2 * | 10/2009 | Kantarjiev | G08G 1/0129 701/119 |
| 7,636,630 B2 * | 12/2009 | Fushiki | G08G 1/096716 701/119 |
| 7,665,559 B2 | 2/2010 | de la Torre-Bueno | |
| 7,693,657 B2 * | 4/2010 | Endo | G08G 1/0969 340/995.13 |
| 7,702,452 B2 * | 4/2010 | Kantarjiev | G08G 1/0145 701/117 |
| 7,747,381 B2 * | 6/2010 | Adachi | G08G 1/0104 340/995.13 |
| 7,899,611 B2 * | 3/2011 | Downs | G08G 1/0962 701/119 |
| 7,899,612 B2 * | 3/2011 | Kumagai | G08G 1/0104 340/995.13 |
| 7,908,076 B2 * | 3/2011 | Downs | G08G 1/0104 701/119 |
| 7,958,958 B2 | 6/2011 | de la Torre Bueno | |
| 8,103,443 B2 * | 1/2012 | Kantarjiev | G08G 1/0129 701/423 |
| 8,149,139 B2 * | 4/2012 | Coffee | G07B 15/063 705/13 |
| 8,255,158 B2 * | 8/2012 | O'Neill | G08G 1/096811 701/414 |
| 8,332,132 B2 * | 12/2012 | Groenhuijzen | G01C 21/3415 340/995.13 |
| 8,606,727 B2 * | 12/2013 | Wu | G08G 1/0104 706/12 |
| 8,660,780 B2 * | 2/2014 | Kantarjiev | G08G 1/012 701/117 |
| 8,700,294 B2 * | 4/2014 | Downs | G08G 1/0104 701/119 |
| 8,738,285 B2 * | 5/2014 | Scofield | G01C 21/3492 701/425 |
| 8,788,306 B2 * | 7/2014 | Delurgio | G06Q 10/063 705/7.11 |
| 8,869,038 B2 * | 10/2014 | Eick | G06F 8/30 706/50 |
| 8,886,461 B2 * | 11/2014 | Twardowski | G01C 21/32 701/533 |
| 8,930,123 B2 * | 1/2015 | Srivastava | G08G 1/0112 340/988 |
| 8,977,480 B2 * | 3/2015 | Bekaert | G08G 1/0969 701/117 |
| 9,091,559 B2 * | 7/2015 | Hancock | B60L 3/12 |
| 9,127,959 B2 * | 9/2015 | Kantarjiev | G08G 1/0129 |
| 9,219,658 B2 * | 12/2015 | Kakadia | H04L 41/22 |
| 9,222,793 B2 * | 12/2015 | Shin | G01C 21/3415 |
| 9,257,041 B2 * | 2/2016 | Scofield | G08G 1/0104 |
| 9,257,042 B2 * | 2/2016 | Scofield | G08G 1/052 |
| 9,266,443 B2 * | 2/2016 | Payne | B60L 58/12 |
| 9,299,251 B2 * | 3/2016 | Scofield | G08G 1/0104 |
| 9,358,892 B1 * | 6/2016 | Gaither | B60W 30/18036 |
| 9,396,651 B2 * | 7/2016 | Joseph | G08G 1/0116 |
| 9,401,086 B2 * | 7/2016 | Basalamah | G08G 1/0112 |
| 9,412,267 B2 * | 8/2016 | Joseph | G08G 1/0112 |
| 9,460,615 B2 * | 10/2016 | Basalamah | G08G 1/0112 |
| 9,476,719 B2 * | 10/2016 | Meyer | G01C 21/26 |
| 9,489,838 B2 * | 11/2016 | Fowe | G08G 1/0141 |
| 9,508,264 B2 * | 11/2016 | Chan | G08G 5/0039 |
| 9,613,529 B2 * | 4/2017 | Downs | G08G 1/0141 |
| 9,644,982 B2 * | 5/2017 | Kantarjiev | G01C 21/3691 |
| 9,652,983 B2 * | 5/2017 | Eilertsen | G08G 1/164 |
| 9,702,718 B2 * | 7/2017 | Payne | B60L 3/04 |
| 9,713,962 B2 * | 7/2017 | Payne | B60L 53/62 |
| 9,754,496 B2 * | 9/2017 | Chan | G08G 5/0082 |
| 9,792,575 B2 * | 10/2017 | Khasis | G05D 1/0088 |
| 9,869,560 B2 * | 1/2018 | Gordon | B60W 30/0956 |
| 9,878,607 B2 * | 1/2018 | Caron | B60L 50/13 |
| 9,898,928 B1 * | 2/2018 | Payne | G08G 1/096741 |
| 9,964,414 B2 * | 5/2018 | Slavin | G01C 21/3658 |
| 9,969,271 B2 * | 5/2018 | Ogawa | B60W 10/08 |
| 10,037,695 B2 * | 7/2018 | D'Amato | G07C 5/008 |
| 10,046,752 B2 * | 8/2018 | Ogawa | B60L 50/16 |
| 10,055,981 B2 * | 8/2018 | Downs | G08G 1/0112 |
| 10,106,143 B2 * | 10/2018 | Ogawa | B60L 15/2045 |
| 10,118,603 B2 * | 11/2018 | Payne | B60W 20/12 |
| 10,118,604 B1 * | 11/2018 | Wrobel | G01S 19/42 |
| 10,124,678 B2 * | 11/2018 | Ogawa | B60L 58/13 |
| 10,134,291 B2 * | 11/2018 | Chan | G08G 5/0091 |
| 10,155,510 B2 * | 12/2018 | Nagamiya | B60K 6/22 |
| 10,202,048 B2 * | 2/2019 | Payne | G06V 20/593 |
| 10,266,065 B2 * | 4/2019 | Ogawa | B60L 7/10 |
| 10,354,217 B2 * | 7/2019 | Khasis | G05D 1/0088 |
| 10,358,129 B2 * | 7/2019 | Payne | B60W 50/12 |
| 10,393,533 B2 * | 8/2019 | Upadhyay | F01N 9/002 |
| 10,415,986 B2 * | 9/2019 | Meyer | G01C 21/26 |
| 10,525,848 B2 * | 1/2020 | Nelson | G01C 21/00 |
| 10,657,452 B2 * | 5/2020 | Hayashida | G08G 1/0112 |
| 10,672,264 B2 * | 6/2020 | Downs | G08G 1/0112 |
| 10,753,753 B2 * | 8/2020 | Tseng | G01C 21/3415 |
| 10,794,720 B2 * | 10/2020 | Slavin | G01C 21/3492 |
| 11,042,827 B2 * | 6/2021 | Khasis | G08G 1/0145 |
| 11,049,391 B2 * | 6/2021 | Mintz | G08G 1/0145 |
| 11,069,231 B2 * | 7/2021 | Eilertsen | H04W 4/029 |
| 11,092,453 B2 * | 8/2021 | Upadhyay | F02D 41/029 |
| 11,460,308 B2 * | 10/2022 | Gordon | G05D 1/0295 |
| 2005/0021225 A1 * | 1/2005 | Kantarjiev | G08G 1/0116 701/119 |
| 2005/0068003 A1 * | 3/2005 | Gauthier | B60L 50/16 320/104 |
| 2005/0091176 A1 * | 4/2005 | Nishiuma | G06Q 10/04 706/45 |
| 2005/0171649 A1 * | 8/2005 | Adachi | G08G 1/096716 701/1 |
| 2005/0228553 A1 * | 10/2005 | Tryon | B60K 6/46 701/22 |
| 2006/0025925 A1 * | 2/2006 | Fushiki | G01C 21/26 701/423 |
| 2006/0206256 A1 * | 9/2006 | Kumagai | G08G 1/0104 701/117 |
| 2006/0278449 A1 * | 12/2006 | Torre-Bueno | B60K 6/46 180/65.29 |
| 2007/0208497 A1 * | 9/2007 | Downs | G08G 1/0104 701/117 |
| 2008/0021628 A1 * | 1/2008 | Tryon | B60K 6/46 701/99 |
| 2008/0027639 A1 * | 1/2008 | Tryon | B60K 6/46 701/533 |

(56) References Cited

U.S. PATENT DOCUMENTS

| | | | |
|---|---|---|---|
| 2008/0051977 A1* | 2/2008 | Tryon | B60L 50/16 701/103 |
| 2008/0071466 A1* | 3/2008 | Downs | G08G 1/0104 701/117 |
| 2008/0215233 A1* | 9/2008 | Adachi | G08G 1/096791 701/117 |
| 2008/0221949 A1* | 9/2008 | Delurgio | G06Q 10/063 705/7.11 |
| 2008/0234921 A1* | 9/2008 | Groenhuijzen | G08G 1/091 701/414 |
| 2008/0234927 A1* | 9/2008 | O'Neill | G01C 21/34 701/465 |
| 2009/0018759 A1* | 1/2009 | Endo | G01C 21/3691 701/117 |
| 2009/0070025 A1* | 3/2009 | Kumagai | G08G 1/0116 701/117 |
| 2009/0118996 A1* | 5/2009 | Kantarjiev | G01C 21/3453 701/119 |
| 2009/0198441 A1* | 8/2009 | Kumagai | G08G 1/0104 701/117 |
| 2009/0295599 A1* | 12/2009 | Coffee | G07B 15/063 340/928 |
| 2010/0217467 A1* | 8/2010 | De La Torre Bueno | B60W 20/12 701/22 |
| 2010/0268456 A1* | 10/2010 | Kantarjiev | G08G 1/0145 701/465 |
| 2011/0071712 A1* | 3/2011 | Mizuno | B60L 58/12 701/22 |
| 2011/0106416 A1* | 5/2011 | Scofield | G08G 1/0104 701/119 |
| 2011/0112747 A1* | 5/2011 | Downs | G08G 1/0104 701/119 |
| 2011/0161261 A1* | 6/2011 | Wu | G08G 1/0104 706/12 |
| 2011/0202266 A1* | 8/2011 | Downs | G08G 1/0104 701/119 |
| 2011/0224893 A1* | 9/2011 | Scofield | G08G 1/052 701/119 |
| 2011/0313652 A1* | 12/2011 | Hancock | B60L 3/12 701/527 |
| 2012/0089920 A1* | 4/2012 | Eick | G06T 11/206 715/739 |
| 2012/0130625 A1* | 5/2012 | Srivastava | G08G 1/0133 701/119 |
| 2012/0150422 A1* | 6/2012 | Kantarjiev | G01C 21/3667 701/117 |
| 2013/0085659 A1* | 4/2013 | Bekaert | G08G 9/00 701/118 |
| 2013/0218466 A1* | 8/2013 | Twardowski | G01C 21/32 701/533 |
| 2013/0338962 A1* | 12/2013 | Crandall | G08G 1/052 702/142 |
| 2014/0074403 A1* | 3/2014 | Shin | G01C 21/3415 701/537 |
| 2014/0129142 A1* | 5/2014 | Kantarjiev | G01C 21/3691 701/538 |
| 2014/0278052 A1* | 9/2014 | Slavin | G01C 21/3492 701/400 |
| 2014/0309914 A1* | 10/2014 | Scofield | G08G 1/0104 701/119 |
| 2015/0221218 A1* | 8/2015 | Downs | G08G 1/0141 701/119 |
| 2015/0262477 A1* | 9/2015 | Fowe | G08G 1/096716 701/118 |
| 2015/0269837 A1* | 9/2015 | Joseph | G08G 1/0129 701/117 |
| 2015/0269838 A1* | 9/2015 | Joseph | G08G 1/0133 701/117 |
| 2015/0274028 A1* | 10/2015 | Payne | B60L 53/00 903/903 |
| 2015/0295787 A1* | 10/2015 | Kakadia | H04L 43/062 370/236 |
| 2015/0371537 A1* | 12/2015 | Eilertsen | G08G 1/0141 701/117 |
| 2016/0047667 A1* | 2/2016 | Kantarjiev | G08G 1/0129 701/533 |
| 2016/0061610 A1* | 3/2016 | Meyer | B60L 58/12 701/22 |
| 2016/0078756 A1* | 3/2016 | Basalamah | G08G 1/012 701/117 |
| 2016/0078758 A1* | 3/2016 | Basalamah | G08G 1/0141 701/118 |
| 2016/0117921 A1* | 4/2016 | D'Amato | G08G 1/096741 701/117 |
| 2016/0117931 A1* | 4/2016 | Chan | G08G 5/0034 701/120 |
| 2016/0189550 A1* | 6/2016 | Chan | G08G 5/0086 701/3 |
| 2016/0253902 A1* | 9/2016 | Yokoi | G08G 1/0112 348/149 |
| 2016/0282132 A1* | 9/2016 | Bostick | G08G 1/012 |
| 2016/0300151 A1* | 10/2016 | Bostick | G08G 1/096838 |
| 2016/0311423 A1* | 10/2016 | Storm | G06Q 50/30 |
| 2016/0325637 A1* | 11/2016 | Payne | B60L 50/16 |
| 2016/0364983 A1 | 12/2016 | Downs | |
| 2017/0021730 A1* | 1/2017 | Ogawa | B60L 7/18 |
| 2017/0021820 A1* | 1/2017 | Ogawa | B60L 15/2045 |
| 2017/0021823 A1* | 1/2017 | Ogawa | B60L 15/20 |
| 2017/0030725 A1* | 2/2017 | Gordon | G01C 21/3415 |
| 2017/0038222 A1* | 2/2017 | Meyer | B60L 58/12 |
| 2017/0088000 A1* | 3/2017 | Payne | B60L 53/64 |
| 2017/0098167 A1* | 4/2017 | Hayashida | G01C 21/3492 |
| 2017/0120890 A1* | 5/2017 | Payne | G08G 1/096833 |
| 2017/0144650 A1* | 5/2017 | Nagamiya | B60K 6/22 |
| 2017/0162041 A1* | 6/2017 | Downs | G08G 1/0129 |
| 2017/0262790 A1* | 9/2017 | Khasis | G08G 1/012 |
| 2017/0323249 A1* | 11/2017 | Khasis | G08G 1/0129 |
| 2017/0323572 A1* | 11/2017 | Chan | G08G 5/0026 |
| 2017/0355358 A1* | 12/2017 | Ogawa | B60W 10/00 |
| 2018/0037136 A1* | 2/2018 | Nelson | B60L 5/005 |
| 2018/0065499 A1* | 3/2018 | Ogawa | B60K 6/445 |
| 2018/0080779 A1* | 3/2018 | Gordon | G05D 1/0212 |
| 2018/0299290 A1* | 10/2018 | Slavin | G08G 1/0145 |
| 2018/0340782 A1* | 11/2018 | Tseng | G01C 21/3415 |
| 2018/0340785 A1* | 11/2018 | Upadhyay | G01C 21/3484 |
| 2018/0345965 A1* | 12/2018 | Payne | B60W 30/143 |
| 2018/0365988 A1* | 12/2018 | Eilertsen | G08G 1/0141 |
| 2019/0001836 A1* | 1/2019 | Payne | B60W 10/20 |
| 2019/0012909 A1* | 1/2019 | Mintz | G08G 1/017 |
| 2019/0323849 A1* | 10/2019 | Upadhyay | F01N 9/002 |
| 2019/0325376 A1* | 10/2019 | Khasis | G06Q 10/083 |
| 2020/0122601 A1* | 4/2020 | Nelson | B60L 50/53 |
| 2020/0402394 A1* | 12/2020 | Smith | G08G 1/0129 |
| 2021/0312375 A1* | 10/2021 | Khasis | G01C 21/3697 |

FOREIGN PATENT DOCUMENTS

| | | |
|---|---|---|
| JP | 2007179348 A | 7/2007 |
| JP | 2007287172 A | 11/2007 |
| JP | 2009069924 A | 4/2009 |
| JP | 2010093999 A | 4/2010 |
| JP | 2015184967 A | 10/2015 |
| WO | 2008110321 | 9/2008 |

OTHER PUBLICATIONS

JP2006078405A machine translation filed Sep. 10, 2004 (https://www.j-platpat.inpit.go.jp/c1800/PU/JP-2006-078405/700346DC7BCB27F1D402D91CAF1F863828BCED8B2C3FB427005AFB91A4EF043F/11/en).

JP2010093999A machine translation filed Oct. 10, 2008 (https://www.j-platpat.inpit.go.jp/c1800/PU/JP-2010-093999/5F03B74AB11DOB0B1F0AC3DD929F388F5F2CA8C9B391B38E4089145D9C47F791/11/en).

(56) References Cited

OTHER PUBLICATIONS

Notice of Reasons for Rejection mailed Apr. 19, 2022, in co-pending Japanese Patent Application No. 2018-092168.

* cited by examiner

SYSTEMS AND METHODS FOR MORE ACCURATELY ADJUSTING TRAFFIC PREDICTIONS FOR THE INTENDED USE OF OPTIMIZING BATTERY PRE-CHARGING

TECHNICAL FIELD

The present disclosure relates generally to predicting traffic, and in particular, some embodiments relate to adjusting initial traffic predictions utilizing measured traffic data and/or other vehicle-related data learned over time. In some embodiments, the adjusted traffic predictions may be used to determine one or more optimal times to pre-charge the battery of a hybrid vehicle.

DESCRIPTION OF RELATED ART

Hybrid vehicles have become increasingly popular among consumers concerned with theft environmental impact and with increasing fuel economy. Hybrid vehicles generally utilize an internal combustion engine in conjunction with an electric motor. Hybrid vehicles can achieve better fuel economy over a conventional (internal combustion-only) vehicle because the need for fossil fuel, e.g., gasoline, is reduced. Hybrid vehicles also help reduce the carbon footprint of an individual by lessening the creation of toxic byproducts normally generated when operating a conventional fossil-fuel-powered vehicle. A hybrid vehicle's electric motor can be powered by a battery, which requires recharging. In hybrid vehicles, a controller can monitor a battery state of charge (SOC) and/or battery residual charge to determine when to recharge the battery, as well as determine when to switch from utilizing its internal combustion engine to utilizing its electric motor and vice versa.

BRIEF SUMMARY OF THE DISCLOSURE

In accordance with one embodiment, a method comprises: upon a vehicle reaching a second link of a route being traversed by the vehicle, obtaining historical measured traffic conditions data and a related weighing term for the second link; measuring current traffic conditions at the second link; updating the historical measured traffic conditions data with the current, measured traffic conditions; determining a difference between traffic conditions prediction data generated at a first link of the route traversed by the vehicle regarding the second link and the updated historical measured traffic conditions data; updating the related weighting term based upon the determined difference; and storing the updated, related weighting term in association with the updated historical measured traffic conditions data.

In some aspects, the first route link was traversed prior to the vehicle reaching the second link. Moreover, the related weighting term may comprise a percentage-based value indicating accuracy of the traffic conditions prediction data relative to the current measured traffic conditions. In some embodiments, the method further comprises adjusting a subsequently generated traffic conditions prediction data regarding the second link to increase accuracy of the subsequently generated traffic conditions prediction data in accordance with the updated historical measured traffic conditions data and the updated, related weighting term.

The subsequently generated traffic conditions prediction data can be adjusted according to the following equation:

adjusted traffic conditions prediction=(traffic conditions prediction* $\alpha$)+(historical measured traffic conditions*(1-$\alpha$))

wherein $\alpha$ is the related weighing term.

In some embodiments, the method further comprises adjusting pre-charge timing for a battery of the vehicle based upon the adjusted, subsequently generated traffic conditions prediction data.

In accordance with one embodiment, a system comprises: a database storing historical measured traffic conditions data; a navigation adjustment component that, upon a vehicle reaching a second link of a route being traversed by the vehicle: obtains historical measured traffic conditions data and a related weighing term for the second link from the database; measures current traffic conditions at the second link; updates the historical measured traffic conditions data with the current, measured traffic conditions; determines a difference between traffic conditions prediction data generated at a first link of the route traversed by the vehicle regarding the second link and the updated historical measured traffic conditions data; updates the related weighting term based upon the determined difference; stores the updated, related weighting term in association with the updated historical measured traffic conditions data in the database; and upon a subsequent traversal of the route, adjusts subsequently generated traffic conditions prediction data based upon the updated, related weighting term and the updated historical measured traffic conditions data. The system further comprises a controller to which the adjusted, subsequently generated traffic conditions prediction is transmitted, the controller adjusting pre-charge timing applied to a battery of the vehicle based upon the adjusted, subsequently generated traffic conditions prediction.

In some embodiments, the system further comprises a navigation server from which the traffic conditions prediction data and the subsequently generated traffic conditions prediction data is received. In some aspects, each of the historical measured traffic conditions data, the traffic conditions prediction data, and the subsequently generated traffic conditions prediction data comprises one or more data values indicative of traffic conditions along at least one link of the route. In some aspects, the one or more data values reflect one of clear traffic conditions, crowded traffic conditions, and jammed traffic conditions.

In some aspects, the historical measured traffic conditions data is tagged in the database with a time of day during which the vehicle previously traversed the second link of the route. In some aspects, the traffic conditions prediction data generated at a first link of the route traversed by the vehicle regarding the second link is generated at the same or similar time of day.

In some aspects, the related weighting term comprises a percentage-based value indicating accuracy of the traffic conditions prediction data relative to the current measured traffic conditions.

In some aspects, the subsequently generated traffic conditions prediction data is adjusted according to the following equation:

adjusted traffic conditions prediction=(traffic conditions prediction* $\alpha$)+(historical measured traffic conditions*(1-$\alpha$))

wherein $\alpha$ is the related weighing term.

In some aspects, the historical measured traffic conditions data is characterized based upon at least one of: a speed at which the vehicle is traveling; the amount of times the vehicle brakes; relative position of the vehicle; and relative motion of the vehicle.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
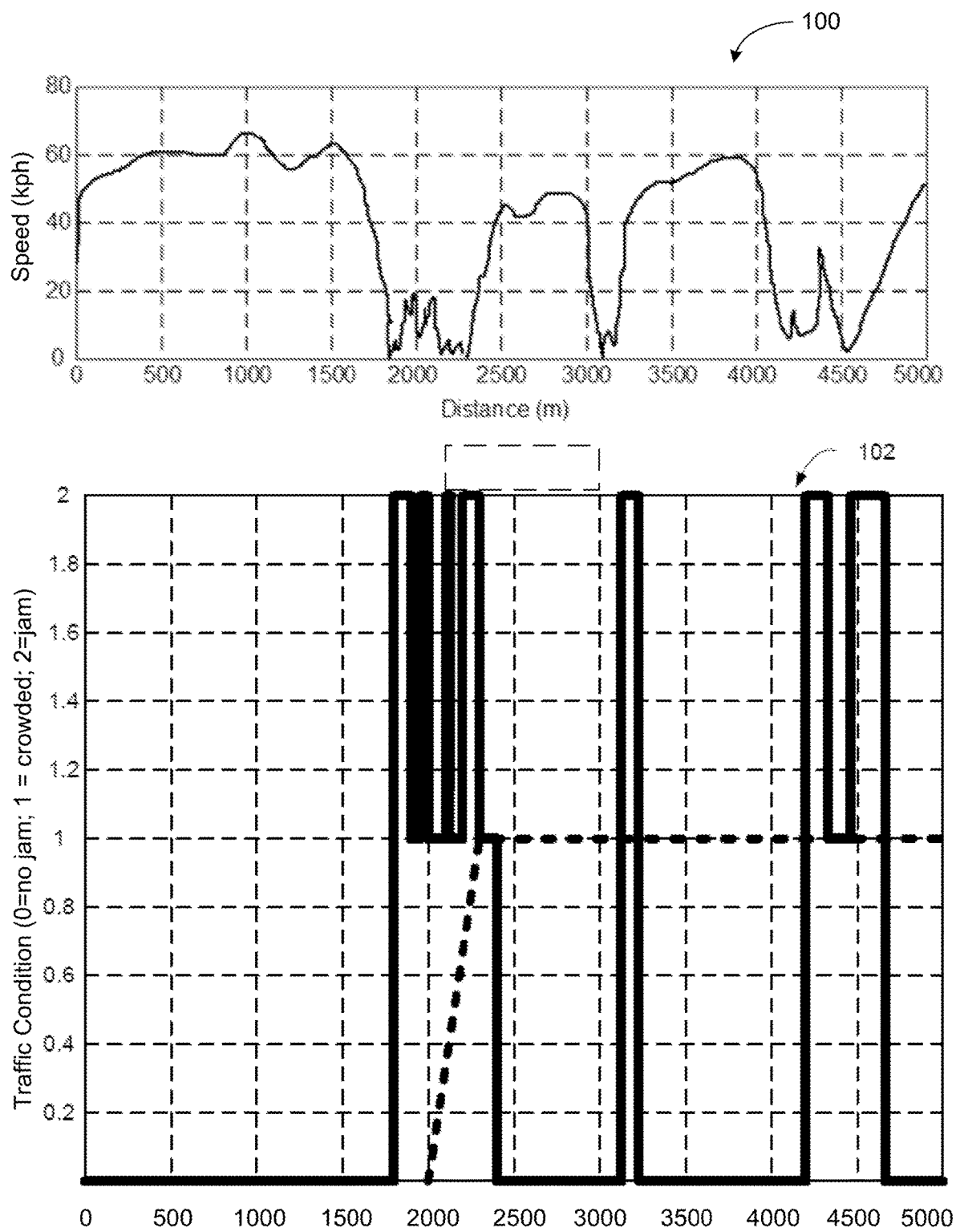
FIG. 1 is a graphical illustration comparing actual traffic conditions relative to speed and predicted traffic conditions.

The figures are not exhaustive and do not limit the present disclosure to the precise form disclosed.

DETAILED DESCRIPTION

Embodiments of the systems and methods disclosed herein can utilize predicted traffic conditions along a determined route to make determinations regarding operational modes for hybrid vehicle operation. For example, based on traffic conditions predicted for a future point along a determined route, it may be determined to conserve or even charge the battery at a given time along the route so that battery operation can be relied on more heavily at that future point along the route. Likewise, based on predicted traffic conditions it may be determined that battery operation should be more heavily relied on at a current location along the route and that the battery can be charged, or relied on less, at a later point in the route.

Some embodiments can be implemented to optimize predictions regarding traffic conditions based upon actual traffic conditions measured during previous traversals of the same route, or segments thereof. That is, in some embodiments, predictions regarding future traffic conditions (e.g., traffic conditions at a subsequent or future point along a route that will be traversed) can be adjusted to obtain better accuracy.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

In some embodiments, actual traffic conditions can be measured based on speed or other factors as one or more vehicles traverse a given route. These measured traffic conditions can be compared to predicted traffic conditions. In some embodiments, the adjusted traffic condition predictions may be used to better gauge hybrid operational modes along the route (e.g., to determine an optimal time(s) during which a battery of a hybrid vehicle can be pre-charged).

A weighting term can be associated with the measured traffic conditions based upon the comparison. The measured traffic conditions data and weighting term may be stored. During a subsequent time that the vehicle traverses the route, a traffic conditions prediction may be made. The stored weighting term and measured traffic conditions data can be used to adjust the traffic conditions prediction for better accuracy.

As alluded to above, hybrid vehicles have become increasingly popular with consumers. Electric motors used in hybrid vehicles do not consume fossil fuels while stopped, e.g., an electric motor can be turned off while the hybrid vehicle is at a traffic stop. Moreover, electric motors generally consume less energy than internal combustion engines while driving in the city or in stop and go traffic. However, internal combustion engines typically provide better performance at higher speeds and can deliver more power for a given engine's weight. Hence, during crowded or jammed traffic conditions (e.g., stop and go traffic), it is generally preferred to use the hybrid vehicle's electric motor. Additionally, a hybrid vehicle's battery can be charged using regenerative braking force (that is more frequently experienced during crowded or jammed traffic conditions). At higher speeds, e.g., over approximately 64 kmh, the internal combustion engine may take over to provide better acceleration and performance that consumers may prefer when driving, e.g., on a highway. A hybrid vehicle's internal combustion engine may also be used to charge the hybrid vehicle's battery while in operation.

Some hybrid vehicles may employ a system designed to pre-charge a battery based upon predicted driving conditions, such as predicted traffic conditions, road topography, etc. For example, the system may predict an upcoming traffic jam so that pre-charging of the hybrid vehicles' batteries is performed to maintain an optimal battery SOC or battery residual charge so that electric-motor operation can be used in the traffic jam. One example of a hybrid vehicle system used to optimize pre-charging of a battery is disclosed in U.S. Pat. No. 5,832,396, which is incorporated herein by reference in its entirety.

These hybrid vehicles may utilize traffic predictions received from and/or based upon information provided by a traffic data service that broadcasts traffic data to vehicles through vehicles' navigation systems. For example, a provider of such a traffic data service may compile real-time traffic data from commercial traffic data providers, departments of transportation, road sensors, traffic cameras, other drivers, etc. Once compiled, the provider may broadcast the traffic data to vehicles via radio frequency to vehicles' navigation systems. The vehicles' navigation systems may use the traffic data to supplement displayed navigation maps with traffic data, deliver traffic alerts, suggest alternate routes, etc. In the case of the aforementioned hybrid vehicles, the traffic data may also be used to determine when a battery should be pre-charged.

However, the traffic data can be inaccurate due to system malfunctions, and it can have a limited shelf life, especially at the beginning or end of rush hour. For example, by the time a traffic data service provider has gathered, compiled, and promulgated traffic data to vehicles, traffic conditions may have changed. Likewise, by the time the vehicle has traveled from one segment of its route to the next, actual traffic conditions may have changed materially. Thus, when a vehicle receives the traffic data, it may no longer be valid. This can result in a negative driving experience for vehicle drivers. Moreover, because such traffic data may be used to predict when a hybrid vehicle's battery should be pre-charged, opportunities for pre-charging the battery can be missed. Inaccurate traffic conditions predictions can also result in a non-optimal battery SOC and/or battery residual charge. In these cases, a hybrid vehicle may be forced to use its internal combustion engine when utilizing its electric motor would be preferred.

FIG. 1 illustrates an example scenario involving an inaccurate traffic conditions prediction. Graph 100 represents the speed at which a vehicle is driven over a given distance. As illustrated in FIG. 1, the speed of the vehicle begins to increase from approximately 0 m to 1250 m along a particular route, for example, a highway. At about 1500 m, the speed drops to anywhere from about 0 to 20 kmh. This can be considered indicative of a traffic jam condition. At about 2400 m, the speed of the vehicle begins to increase again, and so on.

Graph 102 of FIG. 1 represents an example disparity between predicted traffic conditions and actual traffic conditions (relative to speed) shown in graph 100. The solid line in FIG. 1 is representative of the speed of the vehicle shown in graph 100. Speed can be translated into traffic conditions "values" and used in accordance with various embodiments to compare predicted traffic conditions and measured traffic conditions. Values may be assigned to different traffic conditions. For example, a traffic jam condition may be denoted as a value of "2," a crowded traffic condition (less than a jam, but more than clear traffic conditions) may be denoted as a value of "1," and clear traffic conditions may be denoted as a value of "0." Although three values are listed, one of ordinary skill in the art will appreciate that systems may be implemented with greater or fewer numbers of values, as well as values that can reflect increased granularity.

For purposes of discussion, in this example when the vehicle is traveling at speeds above, e.g., 20 kmh, traffic conditions can be assumed to be clear, i.e., a value of 0 in graph 102. When the vehicle speed goes below 10 kmh, this example assumes that the vehicle is in a traffic jam, i.e., a value of 2 in graph 102. During portions of the route where the vehicle's speed is between, e.g., 10 kmh and 20 kmh, this example assumes that the vehicle is experiencing a crowded traffic condition. It should be noted that the characterization of traffic conditions may be based, for example, on speed and type of route or roadway being traversed, although other bases may be used.

However, using conventional traffic data services or systems, predicted traffic conditions can result in error, and they have a limited shelf life. Graph 102 illustrates this scenario vis-à-vis the dashed line, which predicts a traffic jam as only beginning at approximately 2000 m along a route, which is approximately 0.5 km after the traffic jam actually begins. The prediction may also not capture subsequent traffic jams along the route, e.g., at approximately 3000 m and 4250 m along the route. Instead, the traffic conditions prediction merely predicts a crowded traffic condition, e.g., a value of 1, between approximately 2400 m to 5000 m along the route.

Figure 2:
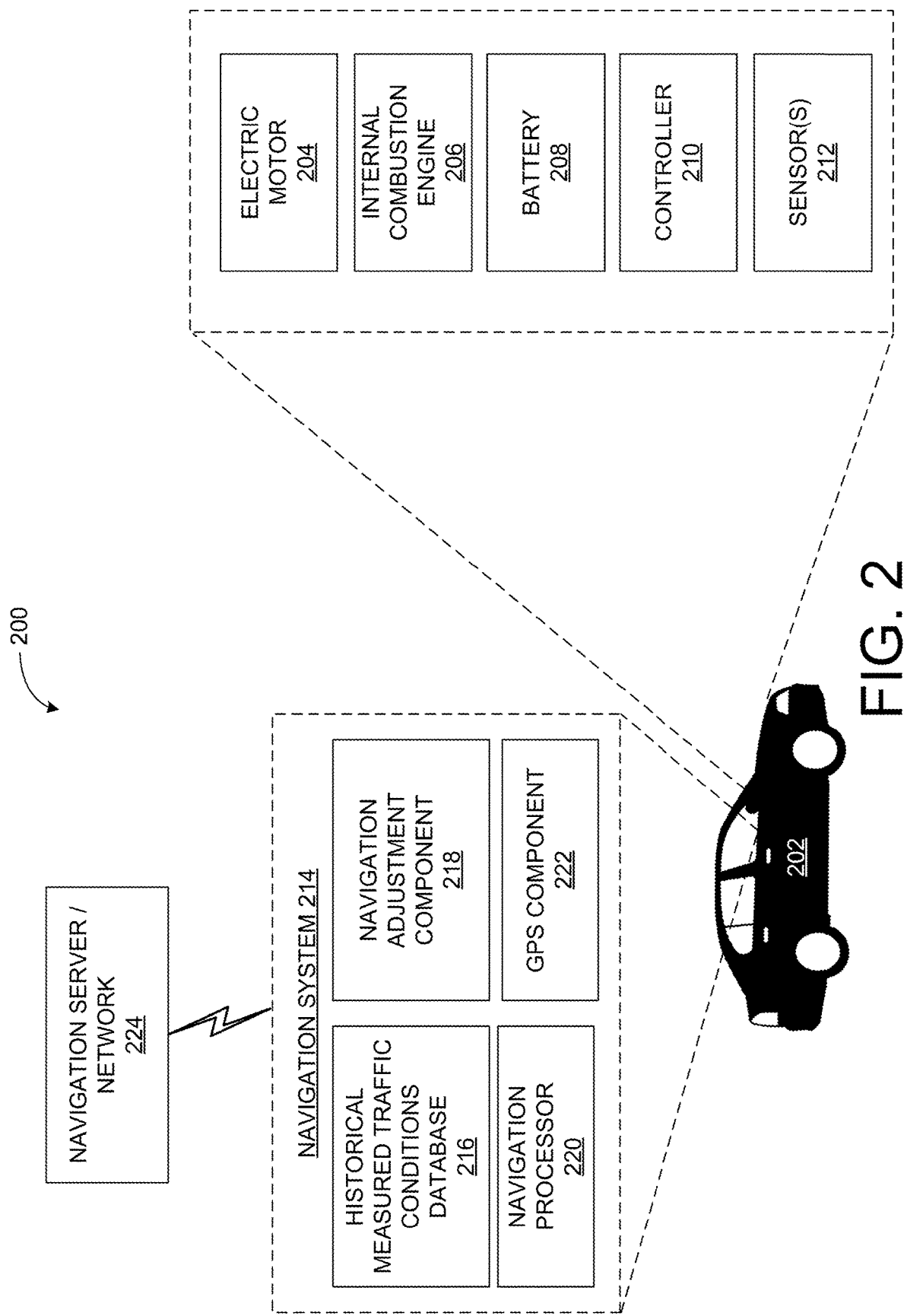
FIG. 2 is a schematic representation of a navigation prediction optimization system.

Accordingly, various embodiments may learn traffic conditions over time, and apply the learned traffic conditions along with a weighting factor to better predict traffic conditions. FIG. 2 illustrates an example system 200 for adjusting predicted traffic conditions in accordance with various embodiments. FIG. 2 illustrates a vehicle 202, which can be a hybrid vehicle having an electric motor 204 and an internal combustion engine 206, both of which generate driving force. Various types of internal combustion engines may be embodied by internal combustion engine 206, such as a gasoline or diesel engine. Various types of electric motors may be embodied by electric motor 204, such as a brushless direct current (DC) motor, an induction motor, or a DC shunt motor.

Hybrid vehicle 202 may include a battery 208 for supplying electric power to drive electric motor 204. Battery 208 may be a rechargeable battery, such as, for example, a lead-acid battery, a nickel-cadmium battery, a natrium sulphur battery, a lithium rechargeable battery, a hydrogen rechargeable battery or a redox type battery. Battery 208 may also be a mass storage condenser, or other suitable power source. It should be noted that hybrid vehicle 202 may have more than one battery, and applying pre-charge timing as described herein can be coordinated between the multiple batteries.

Although not shown, it should be understood that hybrid vehicle 202 may further comprise a battery current/voltage detection sensor for detecting electric current and voltage of battery 208. Hybrid vehicle 202 may also include a driver for changing electric current supplied from the battery 208 into an electric value to produce a predetermined torque by electric motor 204. The driver may further control regeneration current flow electric motor 204 to the battery 208. Hybrid vehicle 202 may include other un-illustrated components typically found in hybrid vehicles, such as an engine control system, a braking system/components, a steering system/components, logic components, other processors, etc.

Hybrid vehicle 202 may include a controller 210 that controls the overall operation of hybrid vehicle 202, one or more sensors 212 connected to the controller 210, and a navigation processor 220 also connected to the controller 210. Controller 210 can judge driving conditions based on various detection signals supplied from the one or more sensors 212 in order to define the driving condition of the hybrid vehicle.

In some embodiments, controller 210 may calculate a residual charge of the battery 208 from an electric current value and voltage value of the battery 208. Accordingly, controller 210 may set a target value for the battery residual charge based on adjusted/optimized traffic conditions predictions which may be supplied to navigation system 214. In this way, the outputs of electric motor 204 and/or internal combustion engine 206 may be adjusted to bring the battery residual charge to a desired target value.

One or more sensors 212 may be used to detect operating characteristics of hybrid vehicle 202, such as speed of travel, brake actuation, acceleration, etc. An example of the one or more sensors 212 may be an accelerator pedal sensor for detecting the degree the accelerator is opened. Another example of the one or more sensors 212 may be a brake sensor for detecting the degree to which the brakes are operated. Still other examples of the one or more sensors 212 may be a shift lever sensor, a vehicle speed sensor, etc. Signals detected by the one or more sensors 212 may be supplied to the controller 210.

One or more of these operating characteristics may be utilized to determine or characterize traffic conditions experienced by hybrid vehicle 202. This in turn may reflect or be used to derive the aforementioned measured traffic conditions data. For example, if one or more sensors 212 determines hybrid vehicle 202 is traveling at a speed of, e.g., 10 kmh or less on a highway, controller 210 may determine that hybrid vehicle 202 is in a traffic jam. If the hybrid vehicle is driving on a city road, a speed of, e.g., 5 kmh or less may be considered to be indicative of a traffic jam. Information regarding the type of road or route on which hybrid vehicle 202 is traveling may be provided to controller 210 by a navigation system, e.g., navigation system 214 described in greater detail below.

A navigation system 214 of hybrid vehicle 202 may include navigation processor 220, as well as a historical measured traffic conditions database 216, a navigation adjustment component 218, and a GPS component 222. In some embodiments, additional components may make up navigation system 214. It should be noted that other components of hybrid vehicle 202 may be used to characterize traffic conditions experienced by hybrid vehicle 202. For example, navigation processor 220 may determine the location of hybrid vehicle 202 using GPS component 222 (which may include or be a GPS receiver) over time. Navigation processor 220 may determine that hybrid vehicle 202 is in a traffic jam if it has not progressed more than a certain distance over a particular duration of time. In some embodiments, navigation system 214 may not have certain components, e.g., GPS component 222. As will be described below, various embodiments may be utilized by vehicles that may not have a conventional navigation system.

One or more communications interfaces (not shown) may connect navigation system 214 to one or more navigation servers/networks 224. The one or more navigation servers/networks 224 may be operated by a traffic data service provider to provide traffic data to navigation system 214. In some embodiments, the one or more navigation servers/networks 224 may provide a traffic conditions prediction to navigation system 214. As alluded to above, and further described below, this prediction can be compared to measured traffic conditions determined, e.g., by the one or more sensors 212, GPS component 222, etc. In other embodiments, traffic data received from the one or more navigation servers/networks 224 may be "raw" data that navigation system 214 can utilize to generate a traffic conditions prediction.

Once a traffic conditions prediction is received and/or determined, the traffic conditions prediction can be compared to the measured traffic conditions. It should be noted that the traffic conditions prediction may be received as data comprising the aforementioned values 0, 1, and 2 depending on whether clear, crowded, or jammed traffic conditions are predicted. In some embodiments, the traffic conditions prediction may be converted or characterized in terms of the values 0, 1, and 2 to allow for ease in comparing the measured traffic conditions and the predicted traffic conditions. It should be noted that other ways of characterizing or normalizing the traffic conditions predictions and the measured traffic conditions may be used, e.g., characterizing with more granular values, using other types of traffic conditions descriptors, etc.

Once the comparison is made, a weighting term can be generated and associated with the measured traffic conditions data. The weighting term can be used to weight the accuracy of the traffic conditions prediction. The weighting term and measured traffic conditions data can be stored in historical measured traffic conditions database 216, and may be organized or additionally characterized by traffic factors such as day, date, time of day, as well as route portion/section, and/or other relevant parameters.

During a subsequent traversal of a particular route portion(s), and upon receipt of a current traffic conditions prediction, historical measured traffic conditions database 216 may be accessed by navigation adjustment component 218. Relevant measured traffic conditions data for the particular route portion(s) may be obtained. Navigation adjustment component 218 may adjust the traffic conditions prediction in accordance with the aforementioned weighting term and previously stored, measured traffic conditions data. In some embodiments this adjusted traffic conditions prediction can be used by controller 210 to determine when to pre-charge battery 208. For example, based upon a prediction that hybrid vehicle 202 is approaching a traffic jam, controller 210 can initiate operation of internal combustion engine 206 prior to reaching the traffic jam in order to pre-charge battery 208. When hybrid vehicle 202 reaches the traffic jam, battery 208 can have a sufficient battery SOC or residual charge that allows electric motor 204 to be used to propel hybrid vehicle 202.

Figure 3A:
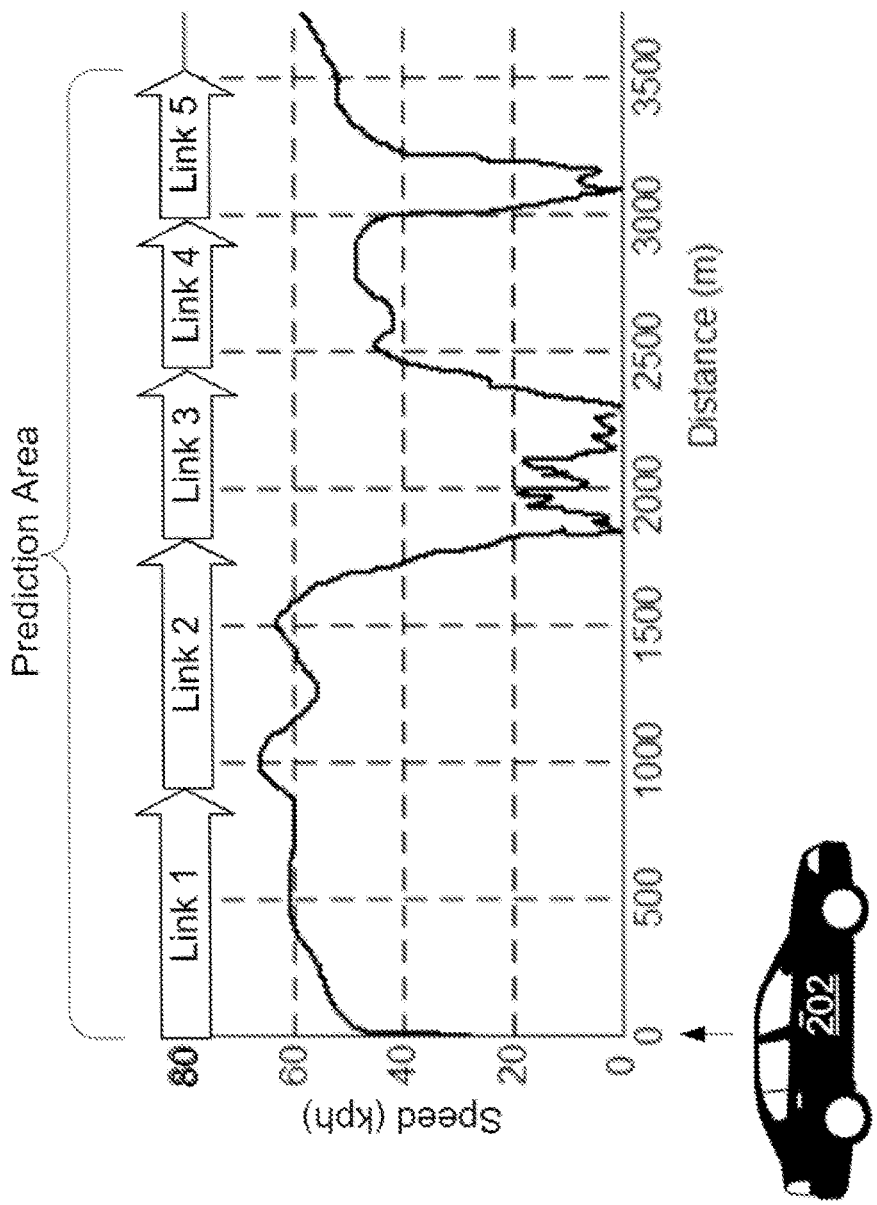
FIG. 3A is a graphical representation of example traffic conditions on a per-link-basis relative to a vehicle's speed.
Figure 3B:
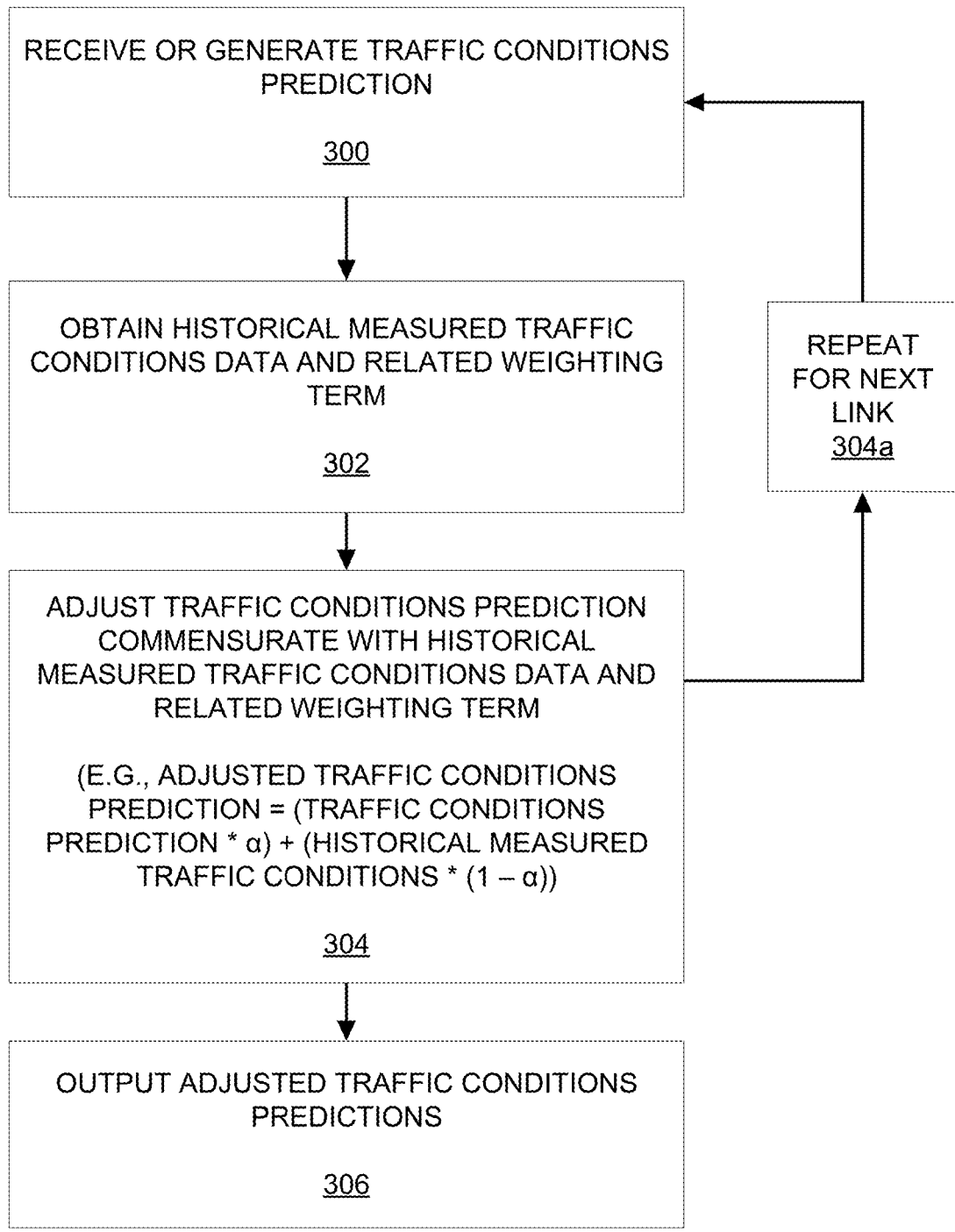
FIG. 3B is a flow chart illustrating example operations that can be performed to adjust predicted traffic conditions based upon traffic conditions determined in FIG. 3A in accordance various embodiments.

FIG. 3A illustrates an example driving scenario, and will be described in conjunction with the flow chart of FIG. 3B, which illustrates example operations that can be performed to adjust a traffic conditions prediction. The example scenario illustrated in FIG. 3A involves hybrid vehicle 202 driving along a route that includes a plurality of segments, e.g., link 1, link 2, link 3, link 4, and link 5. The illustrated links can be used to parse different sections of the route. The aforementioned traffic data services may often obtain and compile traffic data in sets of links. For example, a traffic data service may provide predicted traffic conditions on a per-link basis to vehicles. Links can be defined by the traffic data service, e.g., parts of a routes delineated by road features, such as road signs, intersections, traffic lights, lengths of road (e.g., city blocks), and/or other road or route aspects.

At operation 300 (FIG. 3B), hybrid vehicle 202 is at a point along the route, e.g., at the beginning of link 1, and a traffic conditions prediction may be made or received by the navigation system 214 (FIG. 2). Generally, traffic data service providers predict traffic conditions 2000 m ahead, although other distances may be used. As illustrated in FIG. 3A, the prediction area may cover links 1 through 5. Here, a prediction regarding traffic conditions may be made or received at the beginning of link 1 that predicts traffic conditions through link 3.

At operation 302, navigation adjustment component 218 may access historical measured traffic conditions database 216 to obtain historical measured traffic conditions data that is relevant for the link(s) involved in the traffic conditions prediction. As previously discussed, parameters such as the time of day may be used as a reference point to obtain the relevant measured traffic conditions data. For example, the navigation system 214, controller 210, a clock or component aware of the time may determine a current time of day and transmit the time of day information to navigation adjustment component 218. In some embodiments, components of hybrid vehicle 202 may be clocked or synchronized so that navigation adjustment component 218 is aware of the time of day.

Navigation adjustment component 218 may access historical measured traffic conditions database 216. Navigation adjustment component 218 may retrieve historical measured traffic conditions data that matches the link(s) for which traffic conditions are predicted, e.g., link 3, and which is commensurate with the current time of day. For example, if the current time of day is 2 pm, measured traffic conditions data for link 3 of the route and tagged as being data previously collected at 2 pm or approximately 2 pm may be obtained.

Navigation adjustment component 218 further retrieves a related weighting term associated with the relevant measured traffic conditions data. In some embodiments, each instance of measured traffic conditions data may be stored in historical measured traffic conditions database 216 along with a weighting term. In some embodiments, they may be stored separately, but related or associated with each other such that navigation adjustment component 218 is able to retrieve the relevant weighting term.

As utilized herein, a weighting term can refer to some value, such as a percentage representative of the accuracy of predicted traffic conditions. A higher value may be associated with a traffic conditions prediction that is more accurate, i.e., it comports with the historical measured traffic conditions data. A lower value can indicate a traffic conditions prediction that is less accurate. As is described in greater detail below, a weighting term may be adjusted as the navigation system 214 learns over time.

At operation 304, the traffic conditions prediction may be adjusted commensurate with the historical measured traffic conditions data and the applicable weighting term. An equation, such as that below may be used to perform this adjustment, although other weighting methods or equations/algorithms may be used. The "traffic conditions prediction" parameter may be a traffic conditions prediction generated or received at operation 300. The "historical measured traffic conditions" parameter may be the relevant measured traffic conditions data retrieved from historical measured traffic conditions database 216. The "∝" may be the relevant weighting term.

adjusted traffic conditions prediction=(traffic conditions prediction* ∝)+(historical measured traffic conditions*(1−∝))

As described above, predicted traffic conditions data and measured traffic conditions data may comprise values 0, 1, and 2. Accordingly, for link 3, predicted traffic conditions for a particular link may have a value of 1, while measured traffic conditions for that link may have a value of 2 that is associated with a weighting term of 60 percent. A weighting term of 60 percent indicates that the historical measured traffic data should be favored based on a previous adjustment of a traffic conditions prediction or measured traffic conditions. Applying the equation results in an adjusted traffic conditions prediction of 1.8, which can rounded up to a traffic conditions value of 2.

Operations 300-304 can be repeated for each link (operation 304a) until all the links of the relevant prediction have been adjusted. In this example, the predicted traffic condition for link 2 and link 3 are adjusted as well. At operation 306, adjusted traffic conditions predictions are output for all applicable links, in this example, link 1, link 2, and link 3. The adjusted traffic conditions predictions may be output to controller 210. Based on the adjusted traffic conditions predictions, controller 210 can implement a battery pre-charging timing or strategy for pre-charging battery 208. For example, controller 210 may obtain the electric current and voltage values of battery 208 from a battery current voltage detection sensor (which may be an embodiment of the one or more sensors 212). Controller 210 may compute a residual charge or battery SOC of battery 208 from the electric current and voltage values. Controller 210 may generate a schedule for a target battery residual charge or battery SOC based on the adjusted traffic conditions predictions.

Figure 4A:
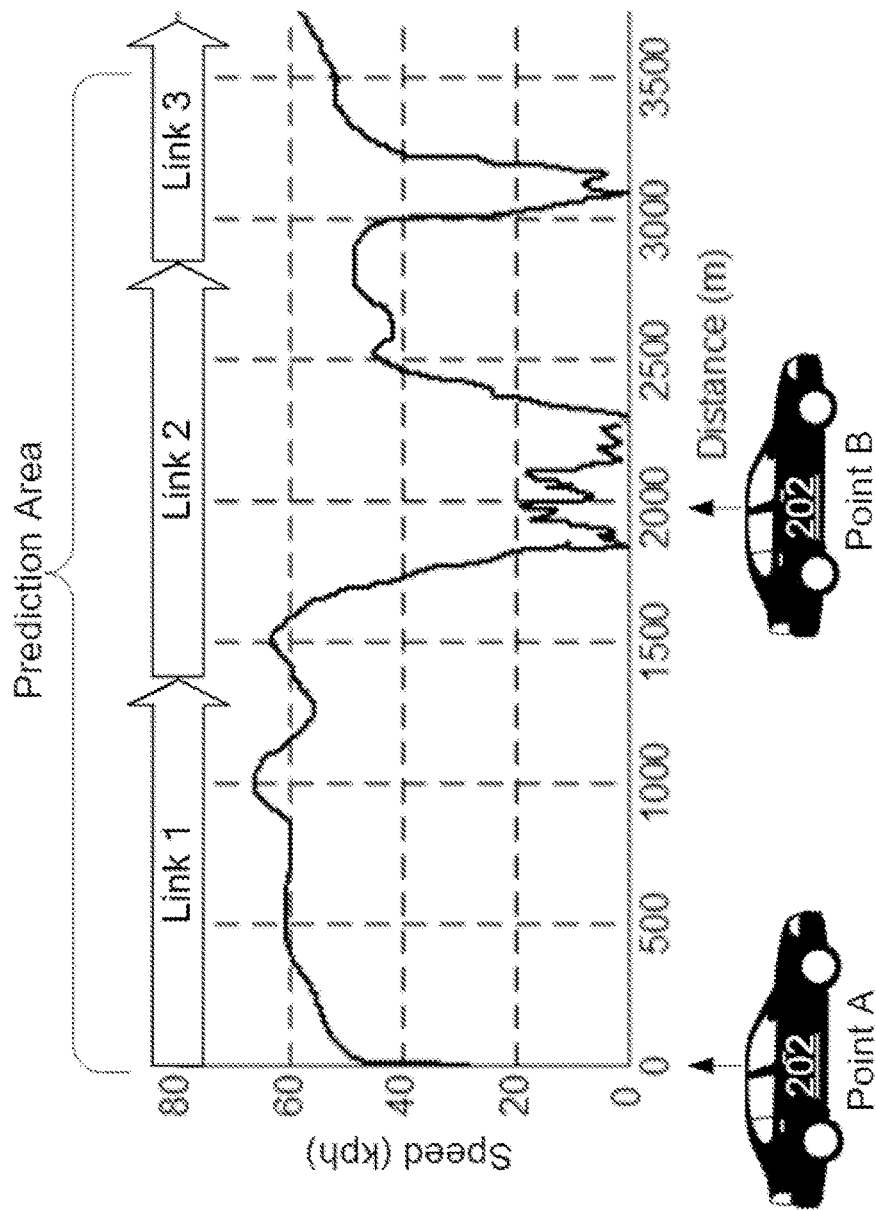
FIG. 4A is a graphical representation of traffic conditions upon which traffic conditions and weighting may be learned and adjusted in accordance with various embodiments.
Figure 4B:
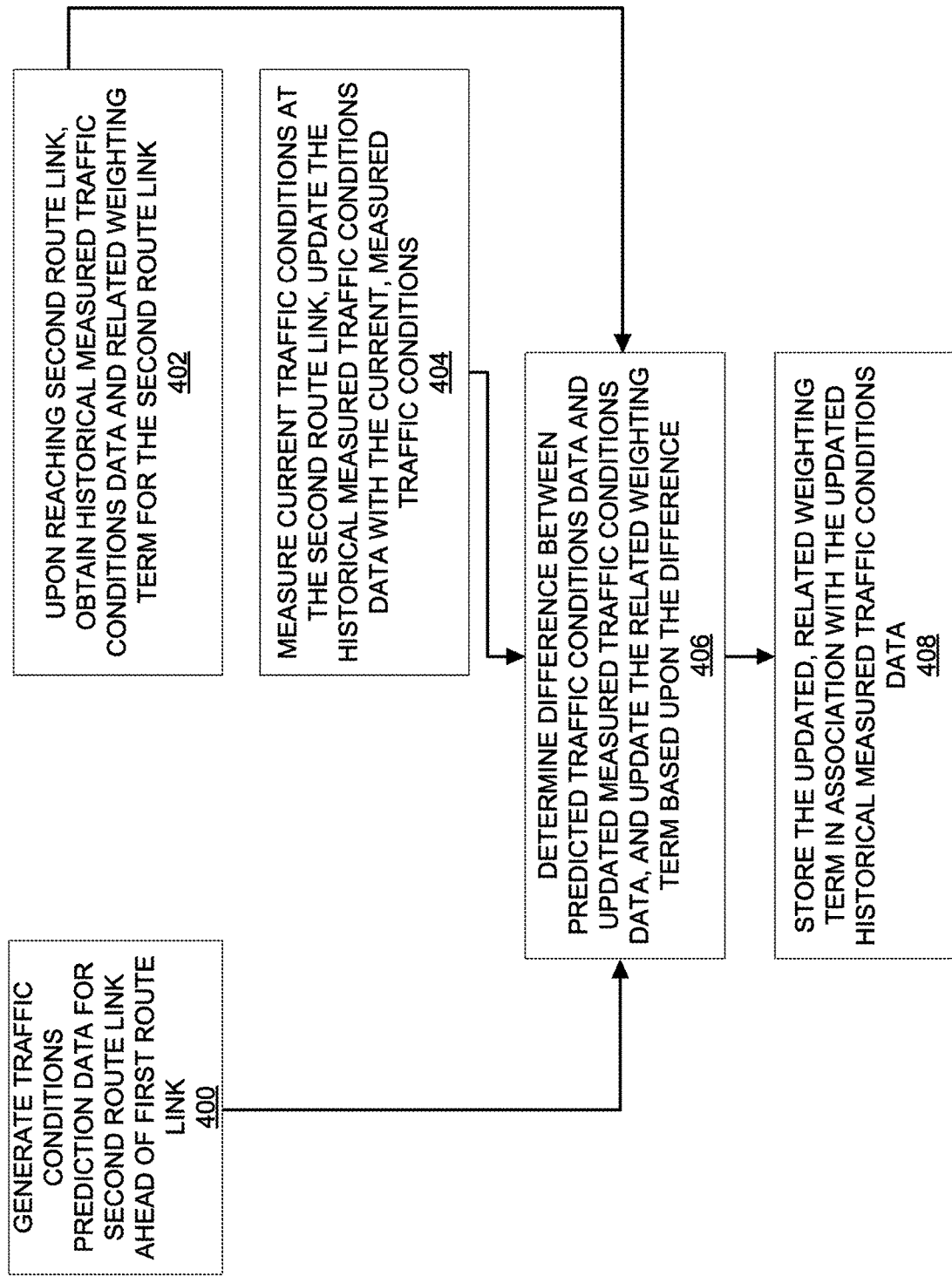
FIG. 4B is a flow chart illustrating example operations that can be performed to learn and update traffic conditions and weighing terms based upon traffic conditions determined in FIG. 4A.

FIG. 4A illustrates an example of traffic conditions learning which can involve adjusting measured traffic conditions data and an associated weighting term. FIG. 4B is a flow chart illustrating example operations for performing traffic conditions learning in accordance with various embodiments, and will be described in conjunction with FIG. 4A.

FIG. 4A illustrates hybrid vehicle 202 as currently being at point B (link 2). When hybrid vehicle 202 was at point A (link 1), traffic conditions at point B were predicted. That is, at operation 400, traffic conditions prediction data for a second route link ahead of a first route link is generated. At operation 402, upon reaching the second route link, in this example, point B/link 2, historical measured traffic conditions data is obtained along with the related weighting term. That is, at point B, navigation adjustment component 218 may access historical measured traffic conditions database 216 to retrieve previously measured traffic conditions, and a previously determined weighting term (at the relevant time) for link 2.

At operation 404, current traffic conditions are calculated or measured at the second route link, and the historical measured traffic conditions data for the link may be updated. That is, data reflecting the current, measured traffic conditions may be stored thereby replacing the previous, historical measured traffic conditions data. For example, while hybrid vehicle 202 is at point B, the current traffic conditions can be measured and characterized. Hybrid vehicle 202's speed can be measured, hybrid vehicle 202's braking can be measured, neighboring vehicle's movement/speed can be measured, etc. These measurements or calculations can be used to characterize current traffic conditions, and may be given a value of 0, 1, or 2 as was previously described. The current measured traffic conditions can be stored and used to update historical measured traffic conditions database 216 for that link, e.g., link 2 and for the relevant time.

At operation 406, the difference between the predicted traffic conditions data and the updated, measured traffic conditions data can be determined. Based upon this determination (which may be accomplished using one or known probabilistic methods and/or algorithms), the related weighting term can be updated or adjusted. For example, the probability that a particular traffic condition will result during subsequent traversal of a route/link can be determined based upon, e.g., a disparity between a predicted traffic condition and a measured traffic condition. For example, comparisons between predicted traffic conditions and measured traffic conditions can be used to develop a "correct" prediction probability for a particular route link. If a predicted traffic condition matches a measured traffic condition, a correct prediction "count" can be increased by some value, e.g., 1. The correct prediction probability could be considered to equal to the correct prediction count divided by the total number of passes/measurement iterations for a route link. Referring to the above-noted equation, the correct prediction probability value can be used as "∝," the weighting term. If the probability is high, then the equation will utilize the prediction more than past measurements and vice versa. The weighting term can evolve so that the predicted traffic conditions are more heavily relied upon (i.e., weighted greater) as navigation system 214 learns. Regardless, the operations of the method illustrated in FIG. 4A allow the most up-to-date traffic conditions data to be used when comparing measured traffic conditions data with predicted traffic conditions data.

At operation 408, the updated weighting term may be stored in association with the updated, historical measured traffic conditions data. Referring back to FIG. 3B, this updated weighting term and updated, measured traffic conditions data is the measured traffic conditions data and weighting term that can be obtained and used to adjust a traffic conditions prediction in a subsequent adjustment.

Various embodiments have been described in the context of adjusting predicted traffic conditions data for the purpose of optimizing battery pre-charging. However, various embodiments can be utilized solely for the purpose of optimizing predicted traffic conditions. In accordance with other embodiments, the adjusted traffic conditions prediction data may be transmitted to neighboring vehicles along a particular route. For example, adjusted predictions may be uploaded back to a traffic data services provider for dissemination, or for use as, e.g., accuracy feedback that the traffic data services provider may leverage to make more accurate predictions. For example, adjusted predictions may be transmitted to other vehicles that are connected to the same navigation server/network. Even vehicles that do not receive predictions regarding traffic conditions from a traffic data service provider may nevertheless utilize the adjusted predictions to predict traffic conditions.

Figure 5:
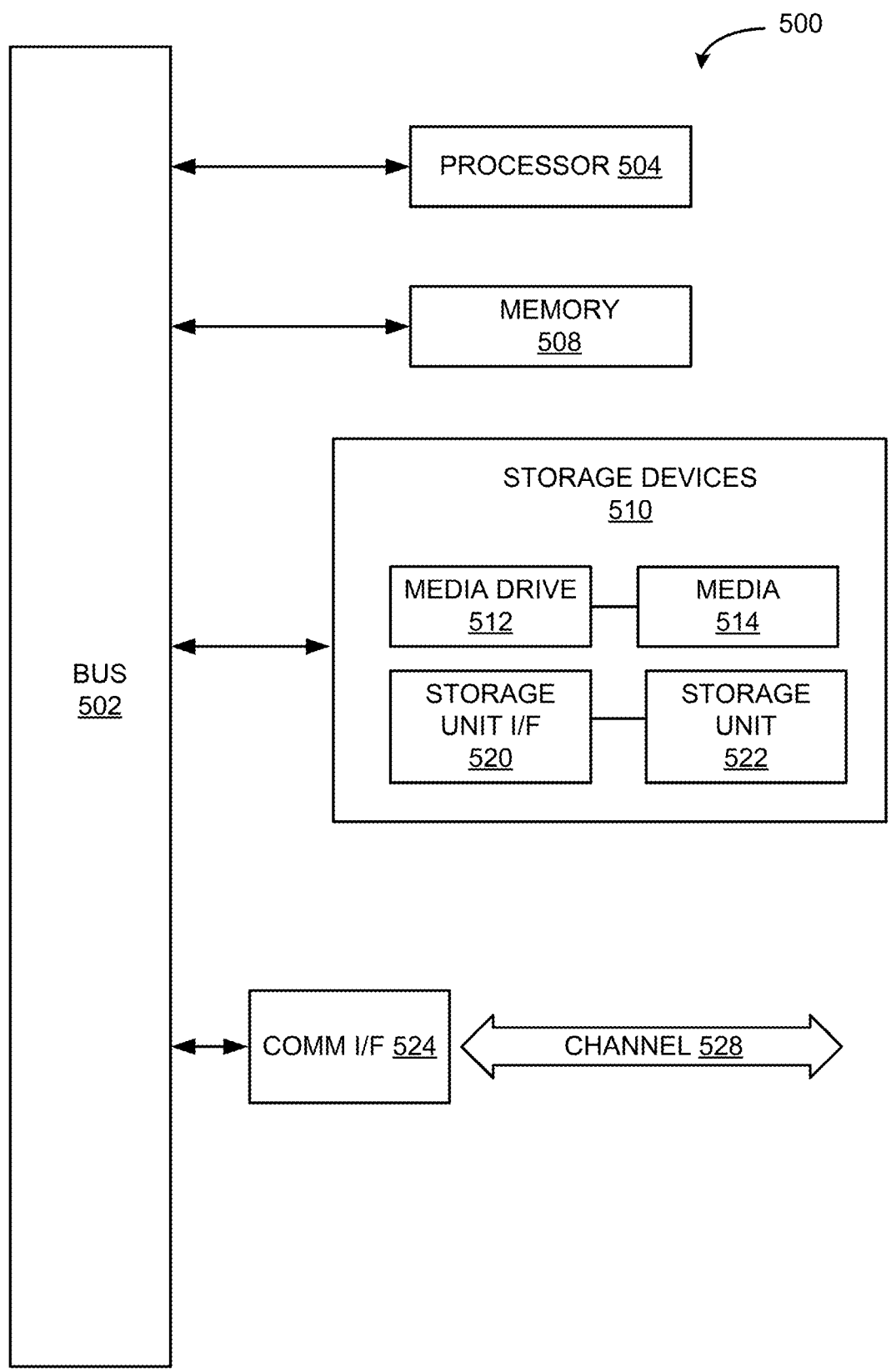
FIG. 5 is an example computing component that may be used to implement various features of embodiments described in the present disclosure.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. This can include a processor, and/or any one or more of the components making up navigation system 214 and its component parts, navigation server/network 224, and controller 210. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as an Ethernet, network interface card, WiMedia, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
   upon a vehicle reaching a second link of an initial route, obtaining historical measured traffic conditions data and a related weighting term for the second link, wherein the initial route comprises a first link traversed by the vehicle prior to reaching the second link and the weighting term is configured as a traffic conditions weighting term;
   measuring current traffic conditions at the second link of the initial route while the vehicle is traveling in the second link of the initial route;
   updating the historical measured traffic conditions data for the second link of the initial route with the current, measured traffic conditions of the second link of the initial route;
   determining a difference between a traffic conditions prediction for the second link of the initial route that was predicted while the vehicle was traveling in a first link of the initial route and the updated historical measured traffic conditions data;
   updating the related weighting term for the second link of the initial route based upon the determined difference;
   storing the updated, related weighting term in association with the updated historical measured traffic conditions data;
   upon the vehicle traversing a subsequent route, adjusting the traffic conditions prediction for the second link of the subsequent route based on the updated, related weighted term, wherein the initial route and the subsequent route are identical and the subsequent route comprises a first link and a second link; and
   adjusting, by a vehicle controller, operations of the vehicle while the vehicle is traveling on the subsequent route to control a pre-charge timing for a battery of the vehicle based on the adjusted traffic conditions prediction, wherein adjusting operations of the vehicle to control the pre-charge timing for the battery of the vehicle comprises operating an internal combustion engine of the vehicle while the vehicle is traveling on the subsequent route to pre-charge the battery to a determined state of charge prior to reaching the second link of the subsequent route.

2. The method of claim 1, wherein the first link of the subsequent route was traversed prior to the vehicle reaching the second link of the subsequent route and adjusting the traffic conditions prediction for the second link of the subsequent route is based on the updated historical measured traffic conditions data.

3. The method of claim 1, wherein the related weighting term comprises a percentage-based value indicating accuracy of the traffic conditions prediction relative to the current measured traffic conditions.

4. The method of claim 1, wherein adjusting the traffic conditions prediction for the second link of the subsequent route is based on the updated historical measured traffic conditions data.

5. The method of claim 4, wherein adjusting the traffic conditions prediction is according to the following equation:

Adjusted traffic conditions prediction=(traffic conditions prediction* α)+(historical measured traffic conditions*(1−α))

wherein α is the related weighing term.

6. The method of claim 4, wherein adjusting the pre-charge timing for a battery of the vehicle is based upon the adjusted, subsequently generated traffic conditions prediction regarding the second link of the subsequent route.

7. A system, comprising:
a database storing historical measured traffic conditions data;
a navigation adjustment component that, upon a vehicle reaching a second link of an initial route being traversed by the vehicle is configured to:
obtain historical measured traffic conditions data and a related weighting term for the second link of the initial route from the database, wherein the weighting term is configured as a traffic conditions weighting term;
measure current traffic conditions at the second link of the initial route while the vehicle is traveling in the second link of the initial route;
update the historical measured traffic conditions data for the second link of the initial route with the current, measured traffic conditions of the second link of the initial route;
determine a difference between a traffic conditions prediction data generated for the second link of the initial route that was predicted while the vehicle was traveling in a first link of the initial route and the updated historical measured traffic conditions data;
update the related weighting term for the second link of the initial route based upon the determined difference;
store the updated, related weighting term in association with the updated historical measured traffic conditions data in the database; and
upon traversing a subsequent route, adjust the subsequently generated traffic conditions prediction data based upon the updated, related weighting term and the updated historical measured traffic conditions data, wherein the initial route and the subsequent route are identical and the subsequent route comprises a first link and a second link; and
a vehicle controller to which the adjusted, subsequently generated traffic conditions prediction data is transmitted, the vehicle controller is configured to: adjust operations of the vehicle while the vehicle is traveling on the subsequent route to control a pre-charge timing applied to a battery of the vehicle while the vehicle is operating in the first link of the subsequent route, the pre-charge timing adjustment based upon the adjusted, subsequently generated traffic conditions prediction data, wherein the adjusted operations of the vehicle to control the pre-charge timing for the battery of the vehicle comprises an operation of an internal combustion engine of the vehicle while the vehicle is traveling on the subsequent route to pre-charge the battery to a determined state of charge prior to reaching the second link of the subsequent route.

8. The system of claim 7 further comprising, a navigation server from which the traffic conditions prediction data and the subsequently generated traffic conditions prediction data is received.

9. The system of claim 7, wherein each of the historical measured traffic conditions data, the traffic conditions prediction data, and the subsequently generated traffic conditions prediction data comprises one or more data values indicative of traffic conditions along at least one link of the subsequent route.

10. The system of claim 9, wherein the one or more data values reflect one of clear traffic conditions, crowded traffic conditions, and jammed traffic conditions.

11. The system of claim 7, wherein the historical measured traffic conditions data is tagged in the database with a time of day during which the vehicle previously traversed the second link of the subsequent route.

12. The system of claim 11, wherein the traffic conditions prediction data generated at a first link of the subsequent route traversed by the vehicle regarding the second link of the subsequent route is generated at the same or similar time of day.

13. The system of claim 7, wherein the related weighting term comprises a percentage-based value indicating accuracy of the traffic conditions prediction data relative to the current measured traffic conditions.

14. The system of claim 7, wherein the subsequently generated traffic conditions prediction data is adjusted according to the following equation:

Adjusted traffic conditions prediction=(traffic conditions prediction* α)+(historical measured traffic conditions*(1−α))

wherein α is the related weighing term.

15. The system of claim 7, wherein the historical measured traffic conditions data is characterized based upon at least one of: a speed at which the vehicle is traveling; the amount of times the vehicle brakes; relative position of the vehicle; and relative motion of the vehicle.

16. The method of claim 1, further comprising, adjusting traffic conditions prediction for the second link of the subsequent route based on the related weighting term for the second link of the subsequent route.

17. The system of claim 7, further comprising, the navigation adjustment component adjusts traffic conditions prediction for the second link of the subsequent route based on the related weighting term for the second link of the subsequent route.

18. The method of claim 1, wherein the determined state of charge for the battery of the vehicle and the operation of the internal combustion engine of the vehicle is determined based upon the updated traffic conditions prediction data for the second link of the subsequent route indicates approaching traffic.

19. The system of claim 7, wherein the navigation adjustment component is further configured to:
generate updated traffic conditions prediction data for the second link of the subsequent route; and
while the vehicle is operating in the first link of the subsequent route, the vehicle controller is further configured to adjust operations of the vehicle to control pre-charge timing for the battery of the vehicle to achieve the determined state of charge level for the battery of the vehicle,
wherein the determined state of charge level for the battery of the vehicle is determined based upon the updated traffic conditions prediction data for the second link of the subsequent route.

20. The method of claim 1, wherein adjusting operations of the vehicle to control the pre-charge timing for the battery of the vehicle comprises operating the internal combustion engine of the vehicle while the vehicle is traveling on the first link of the subsequent route to pre-charge the battery to the determined state of charge (SOC) prior to reaching traffic indicated by the adjusted, subsequently generated traffic conditions prediction data of the second link of the subsequent route and switching the operation of the vehicle to operating an electric motor of the vehicle while the vehicle is traveling on the second link of the subsequent route.

\* \* \* \* \*